Figure 1:
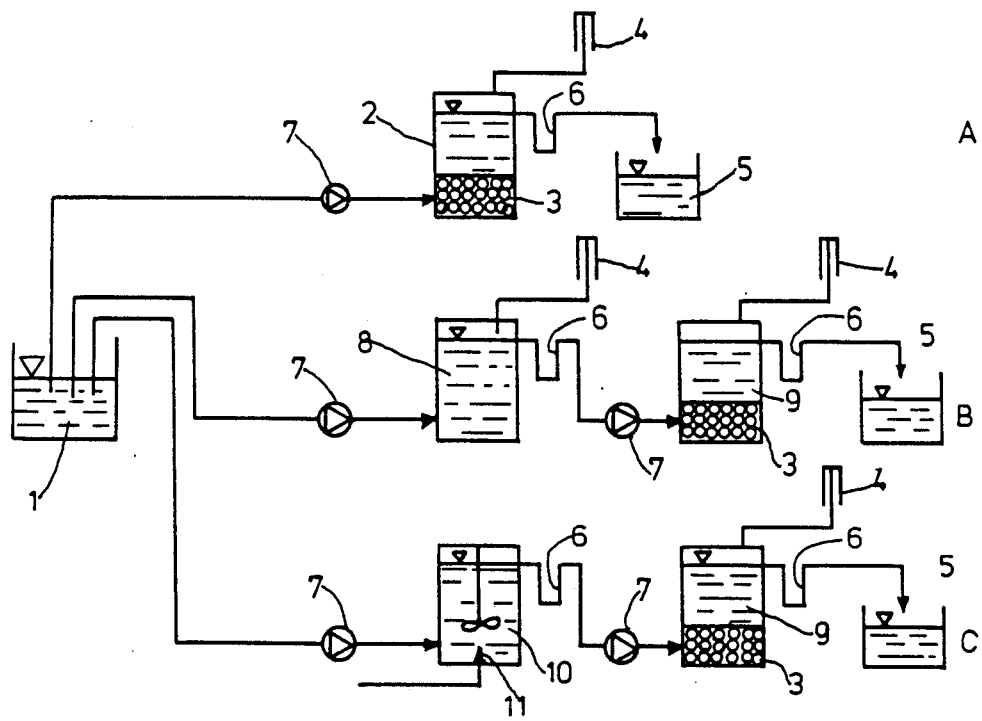

United States Patent [19]
Glanser et al.

[11] Patent Number: 4,968,427
[45] Date of Patent: Nov. 6, 1990

[54] PROCESS FOR THE BIOLOGICAL DEGRADATION OF COMPLEX, NON-READILY DEGRADABLE ORGANIC WASTEWATER CONSTITUENTS

[75] Inventors: Margarete Glanser; Sinisa Ban, both of Zagreb, Yugoslavia; Imre Pascik, Monheim, Fed. Rep. of Germany

[73] Assignee: Bayer Aktiengesellschaft, Leverkusen, Fed. Rep. of Germany

[21] Appl. No.: 345,879

[22] Filed: May 1, 1989

[30] Foreign Application Priority Data

May 4, 1988 [DE] Fed. Rep. of Germany ....... 3815123

[51] Int. Cl.$^5$ .............................................. C02F 3/30
[52] U.S. Cl. .................................... 210/610; 210/613; 210/617; 210/630; 210/631
[58] Field of Search ............... 210/603, 605, 617, 618, 210/630, 610, 611, 613, 614, 631, 739, 743, 746

[56] References Cited

U.S. PATENT DOCUMENTS

| | | | |
|---|---|---|---|
| 4,067,801 | 1/1978 | Ishida et al. | 210/603 |
| 4,469,600 | 9/1984 | Frydman et al. | 210/617 X |
| 4,576,718 | 3/1986 | Reischl et al. | 210/617 X |
| 4,652,374 | 3/1987 | Cohen | 210/603 |

*Primary Examiner*—Tom Wyse
*Attorney, Agent, or Firm*—Sprung, Horn, Kramer & Woods

[57] ABSTRACT

In a two-stage process for the biological degradation of complex, non-readily degradable wastewater constituents, acidification takes place in the first stage and anaerobic degradation in the presence of methanogenic organisms in the second stage. In the first stage, the wastewater is treated both with the acidogenic organisms and with dehalogenating and/or desulfonating and/or deaminating strains. In addition, highly sub-stoichiometric quantities of oxygen, based on the organic carbon load, are introduced in the first stage either directly or indirectly by addition of oxygen-yielding compounds. Both stages are advantageously operated as fluidized-bed processes using supports to immobilize the biomass.

8 Claims, 1 Drawing Sheet

PROCESS FOR THE BIOLOGICAL DEGRADATION OF COMPLEX, NON-READILY DEGRADABLE ORGANIC WASTEWATER CONSTITUENTS

This invention relates to the biodegradation of complex, non-readily degradable organic wastewater ingredients. Wastewater streams of the type in question occur both in basic industries, including for example sawmills and pulp mills, and also in the processing industries, including for example chemical factories, the textile industry, paint shops, tanning plants, etc. These wastewaters generally contain a whole range of very different organics, including in some cases dimers, trimers, oligomers and condensation products thereof, which also differ greatly in their biodegradability.

Wastewaters of the type in question also include, for example, bleaching wastewaters from pulp manufacture. They also include the washing waters from paint shops which contain a number of both readily degradable and also non-readily degradable components. At present, there are hardly any effective, efficient biological processes for solving these problems.

Although anaerobic bacteria show relatively high activity with respect to aromatics, they are highly sensitive to variations in wastewater quality and to inhibiting surges and, in addition, have a very low growth rate so that, in the event of operational disruptions, it can take the plant a very long time to return to full output.

According to DE 3 046 686, retention of the biomass and the buffering of toxic surges are achieved by immobilization on synthetic and natural supports. However, this does not guarantee protection against operational disruptions of the type mentioned above.

According to gmf-Wasser/Abwasser, No. 126 (1985), 2, pages 81–87 (Heijnen et al), high process stability in the anaerobic treatment of complex fermentation wastewaters from the manufacture of yeast is achieved by two-stage anaerobic treatment with organisms fixed to supports. However, the wastewater ingredients in question here are readily degradable.

Two-stage anaerobic processes are suitable in principle for the treatment of the above-mentioned complex wastewater streams. B. Rosen and L. Gunarsson (H.I.T. 85, Symposium über anaerobe Behandlung von Industrieabwässern (Symposium on Anaerobic Treatment of Industrial Wastewaters), Hannover 03.10. to 04.10.1985) report for example on the two-stage anaerobic treatment of wastewaters from pulp manufacture by the chemical/thermomechanical process (CTMP, chemical thermomechanical pulp); despite the two stages involved, there are inevitably surges toxic to anaerobic bacteria which, in this process with detoxification, are intended to prevented by mixing with aerobic surplus sludge.

The problem with the two-stage anaerobic process lies above all in the fact that damage to the hydrolytic and acidogenic biomass in the first stage also causes serious damage to the second, particularly sensitive methanogenic biomass which, in view of the long generation times of these organisms, leads to very long regeneration times or down times of the treatment plant.

It has surprisingly been found that this disadvantage of the two-stage treatment can be obviated if, in the first stage, the wastewater to be treated is enriched not only with the acidogenic organisms, but also with dehalogenating and/or desulfonating and/or deaminating strains and highly sub-stoichiometric quantities of oxygen, based on the organic carbon load, are added directly or indirectly by addition of oxygen-yielding compounds in the same stage and anaerobic degradation takes place in known manner in the second stage in the presence of a biomass containing methanogenic organisms. Accordingly, the process according to the invention essentially comprises subjecting the wastewater to be purified to anoxic/semiaerobic treatment in the first stage and carrying out the second stage under strictly anaerobic conditions in the presence of methanogenic microorganisms optionally fixed to supports.

The process according to the invention may be carried out particularly well if the two stages are operated as fluidized-bed processes using supports to immobilize the biomass. The supports used are preferably particulate polyurethane materials filled with carbon powders bound in reactive, abrasion-resistant form.

In the process according to the invention, the oxygen concentration in the first stage is advantageously kept between 0.01 and 1.2 mg/l, preferably between 0.02 and 1 mg/l and more preferably between 0.05 and 0.8 mg/l.

The pH value in the first stage is best kept between 2.5 and 7.5, preferably between 3.0 and 6.8 and more preferably between 4.0 and 6.5.

The invention affords the following advantages:

With problem wastewaters containing complex, slowly degrading constituents, the process according to the invention achieves basically higher degradation rates than a purely anaerobic two-stage process.

The growth of necessarily anaerobic microorganisms is suppressed in the first stage by the semiaerobic conduct of the process. The process is thus relatively immune to random oxygen surges in the first stage. This ensures higher process stability as compared both with a single-stage and with a two-stage purely anaerobic process.

The COD elimination and the elimination of organic chlorine compounds (AOX) are higher than in the single-stage and also two-stage anaerobic process.

$H_2S$ poisoning of the second stage can be avoided because sulfur ions are converted into elemental sulfur in the first stage.

Accordingly, the invention provides a satisfactory solution to the problem of making the anaerobic wastewater treatment process immune to inhibiting, operationally induced oxygen surges. This results in considerably greater reliability and hence in a basic improvement in anaerobic degradation in the main stage (methane stage).

The invention is illustrated in the following by comparative tests. By means of the experimental plant diagrammatically illustrated in the drawing, the process according to the invention (plant C) was compared with a single-stage process (plant A) and a two-stage aerobic process (plant B). The results are shown in the following Table.

Referring to the drawing, the three plants A, B and C are fed from the same wastewater container 1. Plant A for the single-stage anaerobic process consists of the anaerobic reactor 2 with a packing 3 of supports, a gas meter 4 and a drainage basin 5 which communicates through a siphon 6 with the anaerobic reactor. The wastewater to be treated is fed to the anaerobic reactor 2 by the pump 7 at the bottom of the reactor.

The volume of the anaerobic reactor was 4.0 l. It contained 1000 ml of a packing of particulate supports of modified polyurethane materials filled with carbon powder bound in reactive, abrasion-resistant form. Carbon-modified PUR foam supports of this type are produced in principle by reacting NCO prepolymers with a highly over-stoichiometric quantity of water in the presence of size-reduced, preformed PU foams and carbon powder. These support materials are heavily swollen from their production, have a very high water uptake capacity and form an ideal support matrix for the growth of microorganisms in the aqueous medium. For technical details, see European patent EP 151 937.

To guarantee defined starting conditions for the wastewater treatment process, the wastewater to be treated, which already contained acidogenic microorganisms, was enriched with dehalogenating and/or desulfonating and/or deaminating strains. Enrichment was achieved by specific growth of these strains in a separate step by contacting biomass with substrates which contained the above-mentioned groups of compounds as principal carbon source. It is essential to produce a stable mixed culture with which to start the process.

The quantity of PUR supports introduced into the wastewater to be treated in the anaerobic reactor 2 corresponded to a dry matter content of 85 g DM/1. The wastewater was pumped in at the bottom of the reactor at such a high rate of flow that the PUR supports are whirled around and are kept floating freely in the reactor in a fluidized bed (turbulent and circulating flows). Fluidized-bed reactors such as these are known in the wastewater treatment field and are described in detail, for example, in the book by P.F Cooper and B. Atkinson entitled "Biological Fluidised Bed Treatment of Water and Wastewater"; Ellis Horwood Ltd.; Chichester 1981. Fluidized bed reactors of this type are also used in plants B and C described hereinafter.

Plant B is a state-of-the-art two-stage anaerobic plant. It consisted of two anaerobic reactors 8 and 9 arranged one behind the other, each with a volume of 2.0 l. The wastewater is again pumped in through pumps 7 at the bottom of the reactors 8 and 9. The methane reactor 9 contained 400 ml of the PUR supports described in Example A. As for the rest, identical components are denoted by the same reference numerals in exactly the same way as for plant C described hereinafter.

The process according to the invention was carried out in plant C. In this case, the first stage is a semi-anaerobic reactor 10 with a gas frit 11 at the bottom of the reactor for the introduction of small quantities of oxygen and air. The oxygen input amounted for example to 0.6 mg/l. The reactor contents had a pH value in the range from 6.6 to 6.9. The wastewater pretreated in the reactor 10 was introduced into the methane reactor 9, which is of the same design as in plant B, by the pump 6 through the overflow and the siphon 6. Both reactors 9 and 10 again have a volume of 2 l.

All the reactors were filled with a dehalogenating, anaerobic biomass in the form of a 15% suspension (based on volume). This biomass had been obtained by adaptation by the enrichment method to a mixed wastewater emanating from a sulfite pulp production plant. The reactors were then charged in parallel with the same wastewater (wastewater container 1) under the same COD volume loads. The measurement results characteristic of degradation performance are compared with one another in the following Table.

The chemical oxygen demand (COD) was measured in known manner in accordance with DIN 38 409, Part 41, and the percentage of hydrocarbons absorbable by active carbon (AOX content) in accordance with DIN 38 409, Part 14. The measured values show that process C according to the invention is superior both in regard to degradation performance (COD) and in regard to AOX elimination.

| Plant | Day 44 | | | Day 65 | | | Day 90 | | |
|---|---|---|---|---|---|---|---|---|---|
| | A | B | C | A | B | C | A | B | C |
| COD (mg/l) | | | | | | | | | |
| Unfluent | 2150 | 2150 | 2150 | 2380 | 2380 | 2380 | 1780 | 1780 | 1780 |
| Effluent | 475 | 500 | 458 | 1800 | 1750 | 712 | 1170 | 1210 | 732 |
| % Elimination | 77.9 | 76.7 | 78.7 | 24.4 | 26.5 | 70.1 | 34.3 | 32.0 | 58.9 |
| AOX (mg/l) | | | | | | | | | |
| Influent | 11.5 | 11.5 | 11.5 | 17.0 | 17.0 | 17.0 | 26.7 | 26.7 | 26.7 |
| Effluent | 6.2 | 6.14 | 6.36 | 13.4 | 12.7 | 11.9 | 20.6 | 21.5 | 20.0 |
| % Elimination | 45.9 | 46.6 | 44.7 | 21.2 | 25.3 | 30.0 | 22.8 | 19.5 | 25.1 |

We claim:

1. A two-stage process for the biological degradation of complex, non-readily degradable wastewater constituents in which acidification takes place in a first stage and anaerobic degradation in the presence of methanogenic organisms in the second stage, the improvement comprising, in the first stage, enriching the wastewater to be treated both with acidogenic organisms and also with dehalogenating, desulfonating, deaminating strains of organisms or mixture thereof and introducing highly sub-stoichiometric quantities of oxygen so that the concentration of oxygen in the first stage is in the range of from 0.01 to 1.2 mg/l based on the organic carbon load, the introduction of oxygen being either direct introduction of oxygen or indirect introduction by addition of oxygen-yielding compounds.

2. A process as claimed in claim 1, wherein both stages are operated as fluidized bed processes using supports to immobilize the biomass.

3. A process as claimed in claim 2, wherein the support is a particulate polyurethane material filled with carbon powder bound in reactive, abrasion-resistant form.

4. A process as claimed in claim 1, wherein the concentration of oxygen in the first stage is in the range from 0.02 to 1 mg/l.

5. A process as claimed in claim 4, wherein the concentration of oxygen in the first stage is in the range from 0.05 to 0.8 mg/l.

6. A process as claimed in claim 1, wherein the pH value in the first stage is in the range from 2.5 to 7.5.

7. A process as claimed in claim 6, wherein the pH value in the first stage is in the range from 3.0 to 6.8.

8. A process as claimed in claim 1, wherein the pH value in the first stage is in the range from 4.0 to 6.5.

* * * * *